Sept. 23, 1941.  A. ALFORD  2,256,538
PHASE SHIFTING DEVICE AND CIRCUITS INCORPORATING THE SAME
Filed Oct. 10, 1939  3 Sheets-Sheet 1
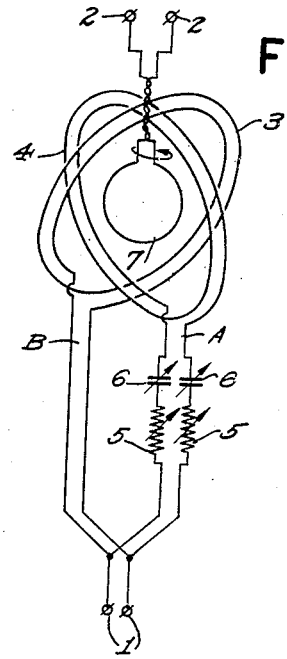
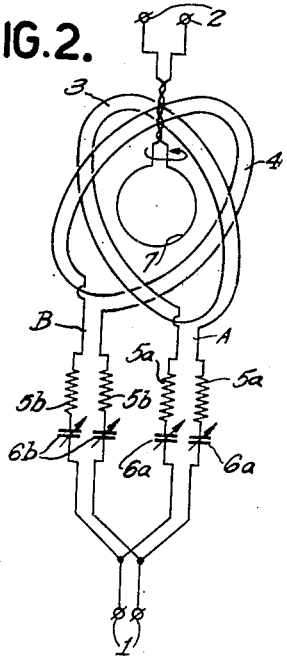
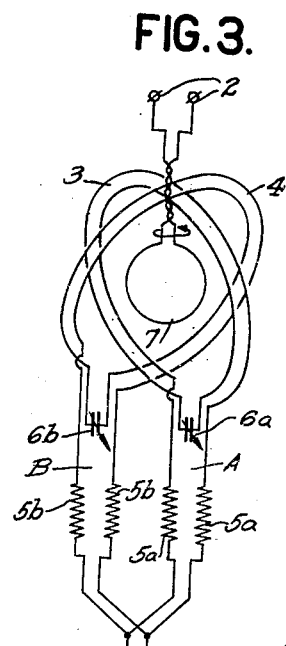
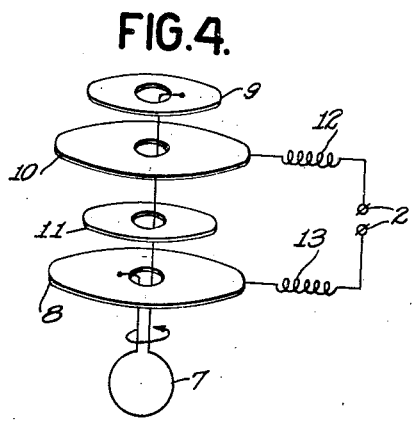
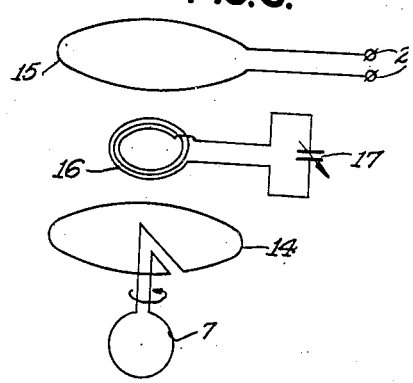
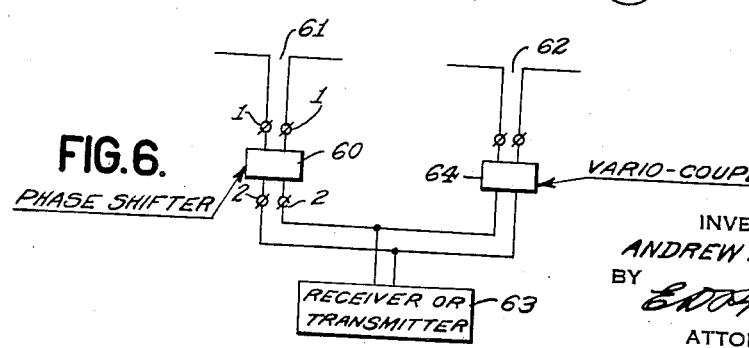
INVENTOR
ANDREW ALFORD
BY
ATTORNEY Sept. 23, 1941.   A. ALFORD   2,256,538
PHASE SHIFTING DEVICE AND CIRCUITS INCORPORATING THE SAME
Filed Oct. 10, 1939   3 Sheets-Sheet 2

INVENTOR
ANDREW ALFORD
BY
E. D. Phinney
ATTORNEY

Sept. 23, 1941. A. ALFORD 2,256,538
PHASE SHIFTING DEVICE AND CIRCUITS INCORPORATING THE SAME
Filed Oct. 10, 1939 3 Sheets-Sheet 3
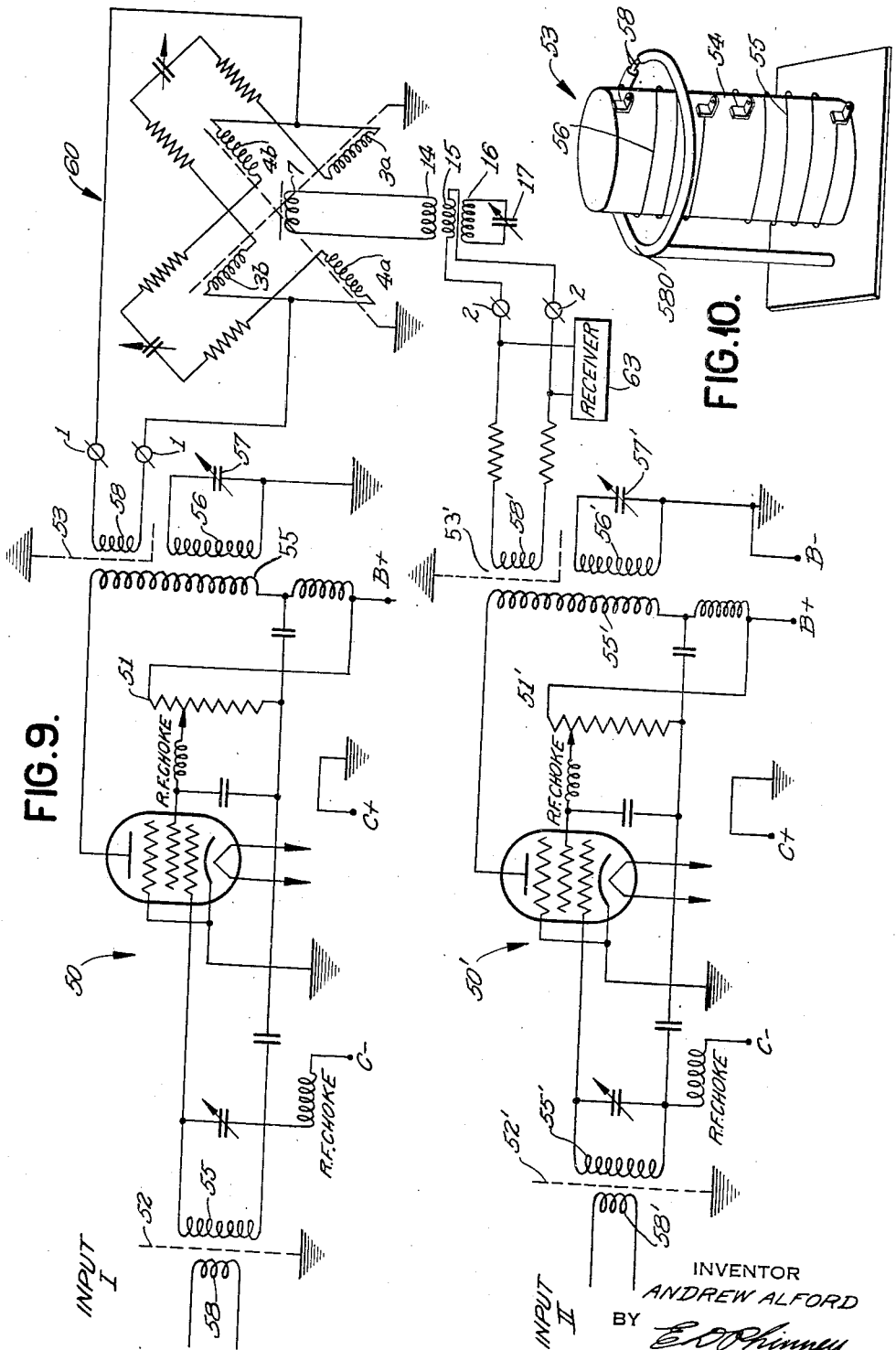
INVENTOR
ANDREW ALFORD
BY
E. O. Phinney
ATTORNEY Patented Sept. 23, 1941

2,256,538

UNITED STATES PATENT OFFICE 2,256,538

PHASE SHIFTING DEVICE AND CIRCUITS INCORPORATING THE SAME

Andrew Alford, New York, N. Y., assignor to Mackay Radio and Telegraph Company, New York, N. Y., a corporation of Delaware Application October 10, 1939, Serial No. 298,770

14 Claims. (Cl. 178—44)

The present invention relates to phase shifting devices and to transmission circuits incorporating such devices.

It is an object of the invention to provide a phase shifting device which shall permit the phase of a wave to be readily and rapidly varied without altering the magnitude thereof. It is another object of my invention to provide a variable coupler of the so-called quadrantal type which may be used as a part of my novel phase shifting device as well as for other uses and which shall be suitable for use with ultra-short waves in the range between 3 and 30 megacycles per second.

It is a further object of my invention to provide a "combining" unit for transferring energy between two pairs of terminals, which may for instance be connected respectively to two antennae and a further pair of terminals which may for instance be connected to a receiver or transmitter, which shall permit ready and rapid variation of the difference between the phase delay in the coupling between one of said two pairs of terminals and said further pair of terminals, as compared with the phase delay in the coupling between the other of said two pairs of terminals and said further pair of terminals without varying the attenuations of either of said couplings. In other words, it is an object to provide an arrangement which may be used to couple two sources to one receiver while permitting ready and rapid adjustment of the difference between the phase delay in the path extending from the first source to the receiver as compared with the phase delay in the path extending from the other source to the receiver without altering the relative attenuations of these two paths or either of them. Likewise it is an object to provide an arrangement which may be used to couple two receivers to one source while permitting ready and rapid adjustment of the difference between the phase delay in the path extending from the source to the first receiver as compared with the phase delay in the path extending from the source to the other receiver without altering the relative attenuations of these two paths or either of them. Although such unit may be used either for combining the outputs of two sources for application to one receiver, or for separating the output of one source for application to two receivers, the unit will for convenience be referred to as a "combining" unit regardless of the direction of transmission therethrough.

It is a further object of my invention to provide a directive antenna array whose effective direction of maximum and/or minimum radiant action may be rapidly and readily varied by means of a combining unit connected to couple two or more antennae to a single wave transmitting apparatus such as a receiver or transmitter.

The exact nature of my invention may best be understood from the following detailed description taken in conjunction with the attached drawings, in which Fig. 1 represents a phase shifting device in accordance with my invention;

Figs. 2 and 3 represent modified forms of phase shifting device in accordance with my invention;

Figs. 4 and 5 represent alternative arrangements for leading energy (by electrostatic induction or electromagnetic induction respectively) to or from the rotor illustrated in Figs. 1, 2 and 3;

Fig. 6 represents a directional transmitting or receiving system employing a plurality of antennae coupled to one wave translating device by means of a combining unit in accordance with my invention;

Fig. 9 is a circuit diagram of a combining unit in accordance with my invention particularly intended for coupling two sources to one load and comprising amplifiers arranged in the proper sense to accord with such direction of transmission; and Fig. 10 is a perspective view illustrating the preferred structural form of coupling means employed in the outputs of the amplifiers illustrated in Fig. 9.

Figure 8:
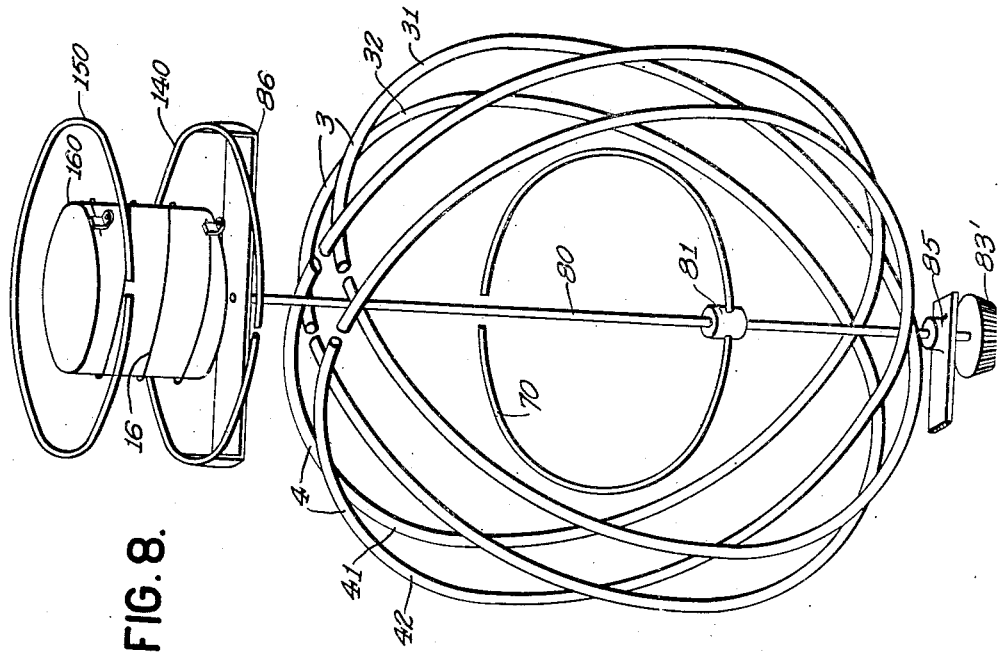
Figs. 7 and 8 are perspective views illustrating preferred structural forms of the quadrantal coupling apparatus schematically illustrated in Figs. 1 to 5.

Referring more particularly to Fig. 1, this figure illustrates a phase shifting device for providing a variable phase delay between terminals 1, 1 and terminals 2, 2 without appreciably varying the attenuation between such terminals. Although either terminals 1, 1 or terminals 2, 2 may be employed as the input with the other terminals serving as the output of the device, it will for convenience be assumed in the following description that terminals 1, 1 constitute the input terminals.

A pair of perpendicularly disposed stator coils 3, 4 are connected to the input terminals 1, 1 so as to be excited thereby, the stator coil 3 being directly connected to the terminals 1, 1 while the stator coil 4 is connected thereto through variable resistors 5, 5 and variable condensers 6, 6 as shown. These condensers and resistors are adjusted to produce a 90° phase relationship between the currents in the coils 3, 4 while yet giving equal current amplitudes in both these stator coils.

If the inductance of each of the stator coils be represented by L so that the impedance of each of these coils is $j\omega L$, the capacitance of each condenser should be $2/\omega^2 L$ so that the combined reactance of both of these condensers in series will be just sufficient to neutralize the reactance of the associated stator coil 4. The resistors 5, 5 should each be $\tfrac{1}{2}\omega L$. Thus the total impedance of the branch including coil 3 will be purely inductive and equal to $j\omega L$ while the total impedance of the branch including coil 4 will be purely resistive and equal to $\omega L$.

The above discussion is based on the assumption that the impedance of each of the coils 3, 4 is purely inductive or at least that the resistive component thereof is so small as to be negligible. If it is desired to take account of the resistive impedance component of each coil the condensers 6, 6 and resistors 5, 5 should be slightly readjusted so as to make the total impedance of the branch including coil 4 as much capacitive as the other branch is resistive.

When the circuit is so adjusted the energy applied to input terminals 1, 1 will create equal currents in coils 3, 4, but with a 90° phase displacement, so that the resulting magnetic field within both these stator coils will be a pure rotating field of constant value. Within this rotating magnetic field of stator coils 3, 4 a rotor coil 7 is provided which is mounted for rotation about the common diameter of coils 3, 4 and this coil 7 is connected by flexible leads to the output terminals 2, 2. The two stator coils 3, 4 and the rotor coil 7 thus form a quadrantal coupling device for coupling either line A or line B to the terminals 2, 2 in such fashion that $K_1^2, K_2^2$ is a constant where $K_1$ represents the coupling coefficient between line A and terminals 2, 2, and $K_2$ represents the coupling coefficient between line B and terminals 2, 2.

The complete arrangement of Fig. 1 consisting essentially of the quadrantal coupler 3, 4, 7 and the phase shifting circuit 5, 5, 6, 6 constitutes a variable phase shifter capable of introducing any desired amount of phase delay between input terminals 1, 1 and output terminals 2, 2 merely by rotating the rotor coil 7 of the quadrantal coupler. It should be noted, moreover, that such rotation of the rotor coil for varying the phase delay between 1, 1 and 2, 2 does not introduce any variation in the attenuation.

Fig. 2 represents an improved phase shifting arrangement incorporating a quadrantal coupler 3, 4, 7 similar to that of Fig. 1 but differing from the arrangement of Fig. 1 in that condensers and resistors are provided in both lines A and B as shown. The resistors 5a, 5a of line A and 5b, 5b of line B may all be equal fixed resistors since the variations of these resistors need not be changed to adjust the devices for operation at different frequencies. In the arrangement of Fig. 2 the condensers 6a, 6a are adjusted so as to only partially neutralize the inductive reactance $j\omega L$ of stator coil 4, leaving a net inductive reactance $jX_1$ whose absolute value is preferably equal to the resistance of resistors 5a, 5a in series. In like manner the condensers 6b, 6b are adjusted to more than neutralize the inductive reactance $j\omega L$ of stator coil 3, thus giving a net capacitive reactance $-jX_2$ whose absolute value is preferably equal to the combined resistance of resistors 5b, 5b in series. When so adjusted the phase of the current in 4 will lag 45° and the current in coil 3 will lead by 45°, thus again giving a 90° phase relationship between the currents in these two coils. The effective impedance of each of the lines A and B as seen from terminals 1, 1 will be equal to 1.41 times the combined resistance of the two corresponding resistors in series. Since these two lines A and B are connected in parallel to terminals 1, 1 the values of these resistors should be correspondingly chosen to give for each of the lines A and B an effective impedance equal to twice the impedance desired at terminals 1, 1.

This arrangement has the advantage that fixed resistors may be used, which in practice is a considerable convenience since it is very difficult to obtain variable resistors which do not also exhibit considerable variable capacity and/or inductance. On the other hand, fixed resistors are comparatively easily obtained and even if these resistors do contain some inductance this is of no significance since it does not vary and therefore is equivalent merely to a slight additional inductance in the stator coils. It should further be noted that in the arrangement of Fig. 2 the desired input impedance at terminals 1, 1 can readily be obtained merely by properly selecting the values of fixed resistors 5a, 5a and 5b, 5b. Furthermore, the setting of the condensers can be roughly determined merely by connecting the output meter to terminals 2, 2 and adjusting the condensers for maximum output. Then the more precise adjustment of these condensers can be determined in the same manner as for the arrangement of Fig. 1, by rotating rotor coil 7 and adjusting the condensers until such rotation produces no change in the output across terminals 2, 2.

Fig. 3 represents a preferred modification of Fig. 2 wherein a single condenser 6a replaces the two condensers 6a, 6a of Fig. 2 and a single condenser 6b replaces the two condensers 6b, 6b of Fig. 2, these single condensers being connected in series with their respective stator coils at the center point thereof as shown. Fig. 1 may be similarly modified by replacing the two condensers 6, 6 by a single condenser serially connected between the two windings of stator coil 4.

In the embodiments of Figs. 2 and 3 the resistors 5a, 5a, 5b, 5b may in some cases be entirely omitted if the effective resistance of the stator windings themselves is rather high or if a low value of impedance at terminals 1, 1 is satisfactory.

Fig. 4 represents an alternative arrangement for inductively leading out the energy from rotor coil 7 to output terminals 2, 2 without the use of pigtails, thus permitting the rotor coil 7 to be continuously rotated in the same direction as many times as may be desired. As shown in Fig. 4, the two ends of the rotor coil 7 are respectively connected to two capacitor rings 8, 9 which are supported for rotation with the rotor coil 7 by a suitable axle, not shown. A pair of stationary capacitor rings 10, 11 which are preferably of slightly larger diameter than rotatable stator rings 8, 9 are disposed so as to be respectively coupled to these rotatable stator rings and are connected through loading coils 12, 13 to the output terminals 2, 2. The output of rotor coil 7 is thus inductively transferred by capacitative induction to the output terminals 2, 2 in such manner as to permit continued rotation of the rotor assembly. The loading coils 12, 13 may be chosen so that together with the inductance of rotor 7 they exactly neutralize the capacities between 8, 11 and 9, 10. Since this can be done only at one frequency, however, it is preferred to choose the loading coils 12, 13 sufficiently large to more than neutralize the capacities at any of the frequencies to be employed and then a pair of variable condensers, not shown, may be connected in series with these loading coils, or if more convenient a single such variable condenser may be connected at a point of symmetry in the circuit connected to terminals 2, 2.

Fig. 5 represents an alternative arrangement for inductively leading out the energy from rotor coil 7 to the terminals 2, 2 by electromagnetic rather than electrostatic induction. As shown in Fig. 5 the rotor 7 is connected to a winding 14 disposed at right angles to and coaxial with the axis of rotation of the rotor and supported to turn therewith by suitable supporting means, not shown. A stationary coil 15 is disposed adjacent to and parallel with winding 14 and is connected to terminals 2, 2. The efficiency of this electromagnetic lead out arrangement may be improved by the addition of a third winding 16 preferably disposed between windings 14 and 15 or within these and connected to a condenser 17, as shown. By tuning the condenser 17 the effective current in rotatable winding 14 can be greatly increased in much the same manner as if the condenser 17 were connected in series with this winding 14 to neutralize the inductances of 14 and 7. This provision of an additional winding 16 between the windings 14 and 15 forms in itself no part of my invention, but constitutes a very useful arrangement for employment in connection with the circuits and structures of my invention.

Figure 7:
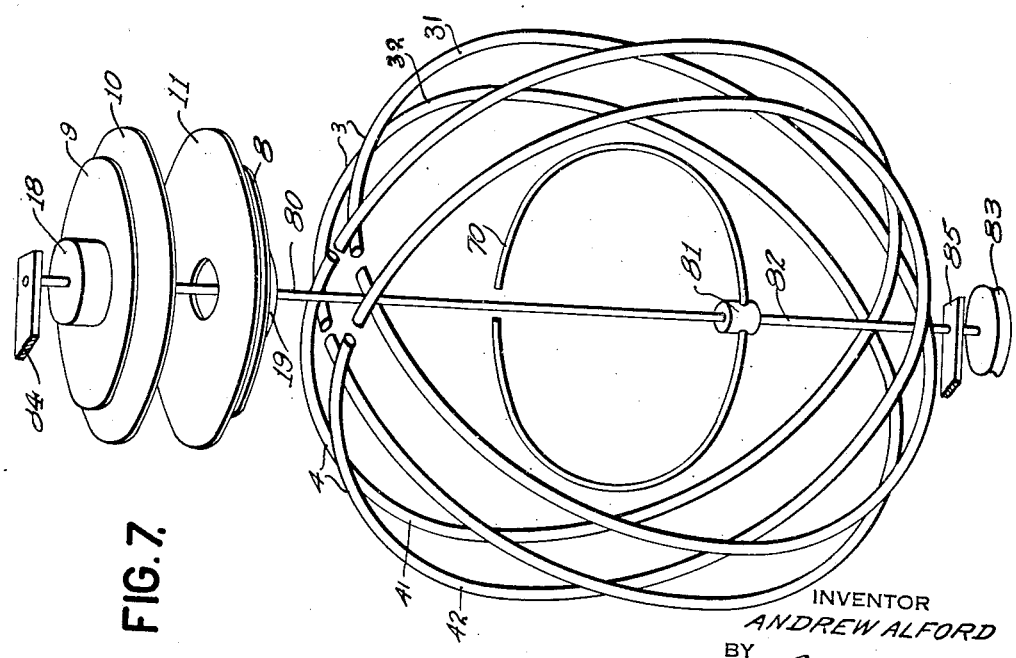

Fig. 7 is a perspective view clearly illustrating the preferred structural form of the embodiment of my invention represented by Fig. 4. The stator coils 3, 4 of Figs. 1, 2 and 3 are each contained in two rings of copper tubing as clearly shown in Fig. 7. In the case of coil 3, these two copper rings are 31, 32 and the windings of coil 3 (not shown in Fig. 7) are disposed half within the ring 31 and half within the ring 32. For example, if coil 3 is to comprise 10 turns the first 5 of these turns are arranged in ring 31 and the next 5 in ring 32, these windings being connected in series with one another and two leads being preferably brought out from the midpoint thereof to include the condenser 6b as shown in Fig. 3. The windings are preferably chosen so as to always have an even number of turns in order that the two halves of each coil may be always equal. The windings of coil 4 are similarly divided between the two copper rings 41, 42. The rings of copper tubing 31, 32, 41, 42 which shield the windings of coils 3, 4 are preferably grounded at their bottom points and open at their top points so as to avoid short circuiting the windings while yet providing a good electrostatic shielding therefor. Preferably also the rings 41, 42 are disposed so as not to make contact with the rings 31, 32 at the upper parts thereof where they cross. The rotor coil 7 is likewise shielded by a further copper tubing 70 which also is opened at its upper end to avoid forming a short circuited loop. Preferably this rotor ring 70 is supported by a hub 81 from the shaft 80 through which the leads from the winding 7 are brought up to the capacitor rings 8, 9. These capacitor rings may be supported from the tubular shaft 80 by Bakelite hubs 18, 19 so as to be insulated from the shaft 80. An extension of the shaft 82 is connected to the hub 81 and carries a pulley 83 which may be used to rotate the complete rotor assembly from a motor, not shown. Bearings 84, 85 support the shaft 80 and the extension 82. The capacitor rings 8, 9 should preferably be aligned as accurately as possible so as not to wobble upon rotation since such wobbling would cause a substantial change in the tuning of the circuit.

Fig. 8 is a perspective view generally similar to Fig. 7 but illustrating the preferred structural form of the embodiment schematically represented in Fig. 5. In Fig. 8 the shaft 80 carries a strap 86 upon which is supported a tubular ring 140 within which is wound the winding 14 (omitted in Fig. 8 in the interests of clarity). A stationary tubular ring 150 contains winding 15 (also omitted for the sake of clarity) this winding 15 being coupled to winding 14 by electromagnetic induction. An additional winding 16 is carried upon a coil form 160, this winding being provided for connection to the condenser 17 as shown in Fig. 5. In place of the pulley 83 a knob 33 is provided in Fig. 8 for manual adjustment of the position of the rotor and the upper bearing 84 is omitted, the lower bearing 85 being correspondingly lengthened to provide rigidity. It will be understood, however, that if desired a motor drive means may be also provided in the embodiment of Fig. 8, but in such case it is preferable to include two separate bearings in view of the higher speeds of rotation involved.

Although all the above units have been described for convenience upon the assumption that terminals 1, 1 serve as the input and terminals 2, 2 as the output, it will be understood that the direction of transmission through the units may be reversed by employing terminals 2, 2 as the input and terminals 1, 1 as the output.

Fig. 6 illustrates a system in accordance with my invention which comprises a phase shifter 60 like any of the arrangements shown in Figs. 1 to 5 inclusive, but preferably of the type shown in Fig. 3 with the lead out means shown in Fig. 4 or 5, and the structural form shown in Fig. 7 or 8. As shown in Fig. 6, two antennae 61, 62 are coupled to a wave translating device 63 through a phase shifter 60 and a vario-coupler 64 respectively. This vario-coupler 64 may be of the conventional type but is preferably constructed with balanced shielded windings like the quadrantal coupler shown in Figs. 7 and 8 but with the stator coil 4 omitted.

The system of Fig. 6 may be used for varying the direction of radiant action of a receiving array. In such case the antennae 61, 62 serve as receiving antennae. If these two antennae receive equal power the vario-coupler 64 is adjusted to produce the same losses as the phase shifter 60 so that the energies from the two antennae are received with equal amplitudes in the receiver 63, the relative phases of these two components being readily and rapidly adjustable by means of phase shifter 60. Thus the direction of maximum radiant action of the receiving array 61, 62 may be readily and rapidly adjusted. If the two antennae 61, 62 are placed one behind the other with respect to the direction of desired reception rotation of the rotor of phase shifter 60 will vary the tilt of the maximum receptive lobe whereas if these two antennae are arranged broadside with respect to the direction of desired reception the directivity may be rotated in a horizontal plane. More than two antennae may be employed and in such case for n antenna n—1 phase shifters 60 will be required.

The arrangement of Fig. 6 may likewise be used for transmission in which case the antennae 61, 62 serve as transmitting antennae and the wave transmitting device 63 should be a transmitter. The action in such case will be similar to that occuring in the case of reception above described except for the reversed direction of power flow.

If desired the arrangement of Fig. 6 may be employed as an automatically adjustable antenna which constantly maintains its maximum receptive lobe oriented toward the direction of optimum reception. For this purpose known control devices will be used such as disclosed in British Patent 433,843 corresponding to U. S. Patent 2,140,130, but instead of providing electronic phase shifting means a simple motor may be arranged for operation by the control apparatus so as to rotate the rotors of the phase shifter 60 to produce the desired adjustment of the receptive lobe.

Fig. 9 schematically illustrates a combining unit in accordance with the present invention. This unit is essentially similar to the combining unit consisting of phase shifter 60 and variocoupler 64 with their associated connections as shown in Fig. 6, but additionally includes amplifier equipment which in the arrangement of Fig. 9 is illustrated as being connected in such sense as to permit combining energy from two sources for application to one load. It will be understood, however, that by reversing the amplifiers the apparatus can be used for coupling a single source to two loads.

In the circuit of Fig. 9 the arrangement generally represented by the reference character 60 is a phase shifter similar to that shown in Fig. 3 with the lead out means of Fig. 5 and the structural form of Fig. 8. The windings 3a, 3b represent the two halves of the stator winding 3 which are respectively disposed within the tubes 31, 32 of Fig. 8. Similarly the windings 4a, 4b represent the two halves of stator coil 4 disposed within the tubes 41, 42. The winding 7 is the rotor winding disposed within tube 70 of Fig. 8 and the winding 14 is the lead out winding shown in Fig. 5 which is disposed within the ring 140 of Fig. 8. The winding 15 is the output winding as shown in Fig. 5 which is disposed within the ring 150 of Fig. 8. Condenser 17 and winding 16 correspond to the same parts of Fig. 5, winding 16 being disposed on the coil form 150 of Fig. 8 and the combination of 16 and 17 being used to effectively tune the circuit 7, 14. Thus the complete apparatus 60 schematically represented in Fig. 9 constitutes a phase shifter for providing a readily adjustable phase delay between terminals 1, 1 and terminals 2, 2 without varying the attenuation. An amplifier 50 is connected to input terminals 1, 1, this amplifier being provided with a variable gain by means of potentiometer 51. The amplifier is generally of conventional design except for the construction of its input and output transformers 52, 53 whose construction is more clearly shown in Fig. 10.

Referring more particularly to Fig. 10 a coil former 54 carries an input winding 55 and an auxiliary winding 56 which is tuned by means of condenser 57 (shown in Fig. 9). The output winding 58 (shown in Figs. 9 and 10) is housed in a ring of copper tubing 580 as shown in Fig. 10. This output winding 58 preferably has a very low inductance, so that direct tuning thereof by means of a condenser connected in the usual manner would require a large amount of capacity, in addition to the fact that such direct tuning would necessitate careful shielding of the condenser. For the purpose of tuning the output winding 58, therefore, the auxiliary winding 56 is employed which is tuned by a condenser of moderate value as shown in Fig. 9. This tuning serves effectively to tune the output winding 58. This particular arrangement does not in itself constitute a feature of my invention, but is disclosed because it forms a very suitable arrangement for incorporation in the combining unit of my invention as shown in Fig. 9.

The input transformer 52 is essentially like the output transformer 53 except that the winding 56 is omitted, the winding 58 is used as a primary, and the winding 55 is used as a secondary.

It will thus be seen that energy received at input I is amplified by amplifier 50 and then transmitted through the phase adjusting device 60 to receiver 63. The second input II is connected to another amplifier 50′ exactly similar to the amplifier 50; and the output of this other amplifier 50′ is connected to the same receiver 63 through a pair of 100 ohm resistors as shown. These resistors serve to introduce a loss approximately equal to the loss introduced by phase shifter 60 and also serve to render the tuning of condenser 17 and the various condensers of the phase shifter 60 more or less independent of the adjustment of the condenser 57′ of amplifier 50′. The circuit constants indicated in Fig. 9 are suitable for use at any frequency in the range from about 5 megacycles to about 19 megacycles, but the values of the windings 3a, 3b, 4a, 4b, 7, 14, 15 and 16 are preferably changed for different sub-ranges within this range in accordance with the following table:

|  | 5-10 mc. | 9.5-16 mc. | 12.5-19 mc. |
| --- | --- | --- | --- |
| 3a | 6T | 4T | 3T |
| 3b | 6T | 4T | 3T |
| 4a | 6T | 4T | 3T |
| 4b | 6T | 4T | 3T |
| 7 | 8T | 7T | 7T |
| 14 | 9T | 8T | 8T |
| 16 | 10T | 6T | 6T |
| 15 | 3T | 3T | 3T |

The table applies to an arrangement wherein the maximum capacities of the variable condensers and the resistances of the resistors have the values indicated in Fig. 9; the shields of the various shielded coils consist of quarter inch copper tubing; the stator rings 31, 32, 41, 42 having an outside diameter of approximately two inches; the rotor ring 70 having an outside diameter of approximately one-half an inch; the lead out ring 140 and the output ring 150 having outside diameters of approximately two and one-half inches; and the ring 580 of the input and output transformers having an outside diameter of approximately two and one-quarter inches.

Although I have shown and described certain embodiments of my invention for the purpose of illustration, it will be understood generally that adaptations, alterations and modifications thereof occurring to one skilled in the art may be made without departing from the scope of my invention as defined in the appended claims.

What I claim is:

1. A quadrantal coupler for high frequencies which comprises two stator coils disposed perpendicular to each other on a common diameter, each coil having two adjacent and parallel windings lying on opposite sides of said common diameter, conductive shielding means substantially surrounding each winding of each such coil, said shielding means being discontinuous along a portion of its length, and a rotor coil disposed within said two stator coils and mounted for rotation about said common diameter.

2. A quadrantal coupler for high frequencies which comprises two stator coils disposed perpendicular to each other on a common diameter, each coil having two adjacent and parallel windings lying on opposite sides of said common diameter, conductive shielding means substantially surrounding each winding of each such coil, said shielding means being provided with a gap in a portion of its length, a rotatable shaft disposed along said common diameter and passing between the two windings of each coil, and a rotor coil disposed within said two stator coils and attached to said shaft to be rotated thereby about said common diameter.

3. A coupler according to claim 2, further comprising means for grounding said first mentioned shielding means.

4. A mixer for variably coupling a first given circuit or a second given circuit or both such circuits in any proportion to a further given circuit with respect to ultra-short waves while maintaining constant the quantity $K_1^2+K_2^2$ where $K_1$ is the coupling coefficient between said first given circuit and said further circuit and $K_2$ is the coupling coefficient between said second given circuit and said further circuit, which comprises two stator coils disposed perpendicular to each other on a common diameter, each coil having two adjacent and parallel windings lying on opposite sides of said common diameter, conductive shielding means substantially surrounding each winding of each such coil, a rotor coil disposed within said two stator coils and mounted for rotation about said common diameter, and conductive shielding means substantially surrounding said rotor coil both of said shielding means being discontinuous along their lengths.

5. A coupler according to claim 1, further comprising a pair of fixed terminals and means for coupling said rotor coil to said terminals by induction.

6. A coupler according to claim 1, further comprising a pair of fixed terminals and means for coupling said rotor coil to said terminals by electrostatic induction.

7. A high frequency phase adjusting arrangement comprising two stator coils disposed perpendicular to each other on a common diameter, each coil having two adjacent and parallel windings lying on opposite sides of said common diameter, conductive shielding means substantially surrounding each winding of each such coil, a rotatable shaft disposed along said common diameter and passing between the two windings of each coil, a rotor coil disposed within said two stator coils and attached to said shaft to be rotated thereby about said common diameter, a pair of fixed terminals coupled to said rotor coil, a further pair of terminals, connections between said further pair of terminals and said two windings of one of said stator coils, further connections between said further pair of terminals and said two windings of the other of said stator coils, and resistance-capacity phase shifting impedances included in said further connections.

8. Arrangement according to claim 7, wherein said phase shifting impedances included in said further connections comprise two variable condensers and two resistors each serially connected between one of said further terminals and one of said two parts of said other of said stator coils.

9. A high frequency phase adjusting arrangement comprising a first pair of terminals, a first stator coil, a second similar stator coil disposed perpendicular to said first coil on a common diameter, connections forming a first circuit from one of said terminals through said first stator coil to said other terminal, connections forming a second circuit in shunt to said first circuit from said one of said terminals through said second stator coil to said other terminal, impedance means including at least one condenser connected in series in said first circuit to render the effective impedance of said first circuit equal in amplitude but 90° different in phase from that of said second circuit, a rotor coil supported within said stator coils for rotation about said common diameter, a second pair of terminals, means coupling said rotor coil to said second pair of terminals, and electrostatic shielding means between said rotor and said stators, whereby rotation of said rotor varies the phase delay of transmission between said first and second pairs of terminals while maintaining constant the attenuation of such transmission.

10. A high frequency phase adjusting arrangement comprising a first pair of terminals, a first stator coil, a second similar stator coil disposed perpendicular to said first coil on a common diameter, connections forming a first circuit from one of said terminals through said first stator coil to said other terminal, connections forming a second circuit in shunt to said first circuit from said one of said terminals through said second stator coil to said other terminal, impedance means including a variable condenser and a resistor connected in series in each of said circuits to render the impedance of said two circuits equal in magnitude but 90° different in phase, a rotor coil supported within said stator coils for rotation about said common diameter, a second pair of terminals, means coupling said rotor coil to said second pair of terminals, and electrostatic shielding means between said rotor and said stators, whereby rotation of said rotor varies the phase delay of transmission between said first and second pairs of terminals while maintaining constant the attenuation of such transmission.

11. A high frequency phase adjusting arrangement comprising a first pair of terminals, a first stator coil, a second similar stator coil disposed perpendicular to said first coil on a common diameter, connections forming a first circuit from one of said terminals through said first stator coil to said other terminal, connections forming a second circuit in shunt to said first circuit from said one of said terminals through said second stator coil to said other terminal, two variable condensers one of which is connected in series with each of said circuits at the electrical center of the associated stator coil, four equal resistances two of which are connected in series with each of said circuits one on each side of the associated stator coil, said condensers and resistances having such value as to render the impedances of said two circuits equal in magnitude but one 45° inductive and the other 45° capacitive in phase, a rotor coil supported within said stator coils for rotation about said common diameter, a second pair of terminals, means coupling said rotor coil to said second pair of terminals, and electrostatic shielding means between said rotor and said stators, whereby rotation of said rotor varies the phase delay of transmission between said first and second pairs of terminals while maintaining constant the attenuation of such transmission.

12. A combining unit comprising a first and a second pair of conductors, a further pair of conductors, a phase adjusting arrangement having a first and a second pair of terminals as claimed in claim 11, connections between said first pair of conductors and said first pair of terminals, connections between said further pair of conductors and said second pair of terminals, lossing means for producing a transmission loss, and connections including said lossing means and extending between said second pair of conductors and said further pair of conductors.

13. A quadrantal coupler for high frequencies which comprises two stator coils disposed perpendicular to each other on a common diameter, each coil having two adjacent and parallel windings lying on opposite sides of said common diameter, conductive shielding means substantially surrounding each winding of each such coil, the shielding means surrounding the other of said coils being electrically connected to the shielding means surrounding the other of said coils at substantially a single point, and a rotor coil disposed within said stator coils and mounted for rotation about said common diameter.

14. A quadrantal coupler for high frequencies which comprises two stator coils disposed perpendicular to each other on a common diameter, each coil having two adjacent and parallel windings lying on opposite sides of said common diameter, conductive shielding means substantially surrounding each winding of each such coil, the shielding means surrounding one of said coils being electrically connected to the shielding means surrounding the other of said coils at substantially a single point and each of said shielding means being discontinuous along a portion of its length, and a rotor coil disposed within said stator coils and mounted for rotation above said common diameter.

ANDREW ALFORD.